(12) United States Patent
Bhagavatheeswaran et al.

(10) Patent No.: US 8,561,997 B2
(45) Date of Patent: Oct. 22, 2013

(54) ADVERSE PRESSURE GRADIENT SEAL MECHANISM

(75) Inventors: Anantha Padmanabhan Bhagavatheeswaran, Karnataka (IN); Ravi Shankar Venkata Kasibhotla, Karnataka (IN); Rohit Pruthi, Karnataka (IN)

(73) Assignee: General Electric Company, Schenectady, NY (US)

( * ) Notice: Subject to any disclaimer, the term of this patent is extended or adjusted under 35 U.S.C. 154(b) by 545 days.

(21) Appl. No.: 12/652,151

(22) Filed: Jan. 5, 2010

(65) Prior Publication Data

US 2011/0163505 A1    Jul. 7, 2011

(51) Int. Cl.
*F01D 11/02* (2006.01)
(52) U.S. Cl.
USPC .................. 277/411; 277/412; 277/418
(58) Field of Classification Search
USPC .............. 277/409, 411, 412, 418, 419; 415/171.1, 173.5, 174.5
See application file for complete search history.

(56) References Cited

U.S. PATENT DOCUMENTS

| | | | | |
|---|---|---|---|---|
| 1,689,735 A * | 10/1928 | Losel | ................... | 277/419 |
| 3,519,277 A | 7/1970 | Crocker | | |
| 4,046,388 A * | 9/1977 | Meyer | .................. | 277/418 |
| 4,257,617 A * | 3/1981 | Hill | .................. | 277/304 |
| 4,420,161 A * | 12/1983 | Miller | .................. | 277/418 |
| 5,599,026 A * | 2/1997 | Sanders et al. | ................ | 277/415 |
| 6,030,175 A * | 2/2000 | Bagepalli et al. | .......... | 415/173.3 |
| 6,105,967 A * | 8/2000 | Turnquist et al. | ............ | 277/355 |
| 6,435,513 B2 * | 8/2002 | Skinner et al. | ................ | 277/303 |
| 6,550,777 B2 * | 4/2003 | Turnquist et al. | ............ | 277/355 |
| 6,572,115 B1 * | 6/2003 | Sarshar et al. | ................ | 277/412 |
| 6,623,238 B2 * | 9/2003 | Langston et al. | ............ | 415/112 |
| 6,779,799 B2 * | 8/2004 | Tong et al. | .................... | 277/411 |
| 6,821,086 B1 * | 11/2004 | Brisson et al. | ............. | 415/174.2 |
| 6,840,519 B2 * | 1/2005 | Dinc et al. | .................... | 277/413 |
| 6,896,482 B2 * | 5/2005 | Parry | .......................... | 415/136 |
| 6,932,350 B1 * | 8/2005 | Husted | ......................... | 277/421 |
| 7,559,554 B2 * | 7/2009 | Hogg et al. | ................... | 277/412 |
| 7,645,117 B2 * | 1/2010 | Bracken et al. | ............ | 415/173.3 |
| 7,909,335 B2 * | 3/2011 | Turnquist et al. | ............ | 277/355 |
| 7,946,591 B2 * | 5/2011 | Pabst et al. | ................... | 277/417 |
| 8,146,922 B2 * | 4/2012 | Maier et al. | ................... | 277/347 |
| 8,162,324 B2 * | 4/2012 | Deo et al. | ...................... | 277/413 |
| 8,182,211 B2 * | 5/2012 | Steiger et al. | ............. | 415/173.7 |
| 2005/0104300 A1 * | 5/2005 | Hogg et al. | ................... | 277/411 |
| 2008/0217859 A1 * | 9/2008 | Addis | .......................... | 277/303 |

* cited by examiner

*Primary Examiner* — Vishal Patel
*Assistant Examiner* — Eugene G Byrd
(74) *Attorney, Agent, or Firm* — Sutherland Asbill & Brennan LLP

(57) ABSTRACT

An adverse pressure gradient seal mechanism for use with variable speed components. The adverse pressure gradient seal mechanism may include a number of labyrinth teeth positioned on a component and an adverse pressure gradient seal positioned between a pair of the labyrinth teeth. The adverse pressure gradient seal may include a number of strips with each of the strips having an angled end.

16 Claims, 3 Drawing Sheets

ADVERSE PRESSURE GRADIENT SEAL MECHANISM

TECHNICAL FIELD

The present application relates generally to steam turbines and gas turbines and more particularly relates to an adverse pressure gradient seal mechanism for leakage flow control in cavities involving variable speed surfaces.

BACKGROUND OF THE INVENTION

In order for a turbine to produce shaft power, steam must pass through both the nozzle and bucket flow passages. Steam bypassing either the nozzles or the buckets due to inter-stage leakage, tip leakage, packing leakage, and other leakage flows are concerns in the turbo-machinery industry given that they do not produce power. Moreover, such leakage flows also may disrupt the flow through the nozzles and buckets so as to decrease turbine shaft output and directly impact overall turbine performance and efficiency. These leakage flows generally are caused by increased clearances between the rotating and the stationary components. The increased clearances may be caused by rubbing, solid particle erosion, foreign object damage, and the like. The amount of the leakage flow is a function of the clearance area, the geometry of the leakage path, and the pressure drop across the component being bypassed.

Currently, rotor-stator gaps and other leakage flow areas are generally sealed with labyrinth type seals. Leakage through such labyrinth seals, however, still may be a significant percentage of the overall main flow even in the best of conditions. As such, even a small reduction in this leakage flow may provide an overall performance advantage.

There is a desire therefore for improved sealing mechanisms for rotating components in turbine-machinery and the like. Improving the leakage flow through such components should improve overall turbine engine performance and efficiency. Simplified manufacture and assembly of the sealing mechanisms also may be provided herein.

SUMMARY OF THE INVENTION

The present application thus provides an adverse pressure gradient seal mechanism for use with variable speed components. The adverse pressure gradient seal mechanism may include a number of labyrinth teeth positioned on a component and an adverse pressure gradient seal positioned between a pair of the labyrinth teeth. The adverse pressure gradient seal may include a number of strips with each of the strips having an angled end.

The present application further provides for a method of limiting a leakage flow through variable speed surfaces. The method may include the steps of positioning a number of labyrinth teeth on one of the variable speed surfaces, positioning an adverse pressure gradient seal between a pair of the labyrinth teeth, rotating the variable speed surfaces, producing an adverse pressure gradient about the adverse pressure gradient seal, and reducing the leakage flow across the variable speed surfaces.

The present application further provides for an adverse pressure gradient seal mechanism for use with a turbine section. The adverse pressure gradient seal mechanism may include a number of labyrinth teeth positioned on a sealing ring between a pair of rotors and an adverse pressure gradient seal positioned between a pair of the labyrinth teeth. The adverse pressure gradient seal may include a number of strips with gaps therebetween. Each of the strips may include an angled end.

These and other features and improvements of the present application will become apparent to one of ordinary skill in the art upon review of the following detailed description when taken in conjunction with the several drawings and the appended claims.

DETAILED DESCRIPTION

Figure 1:
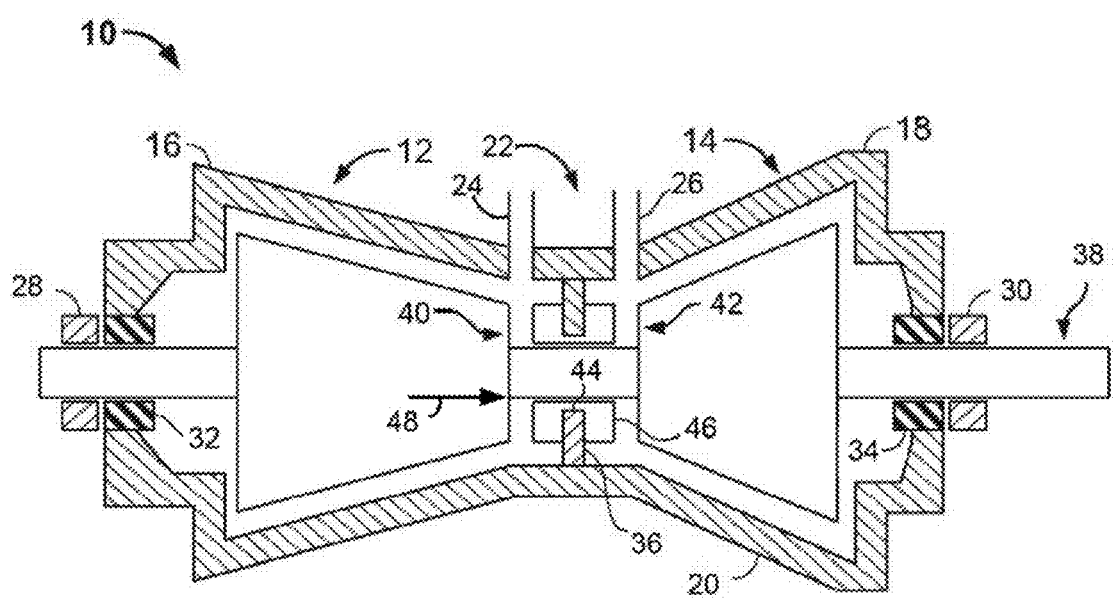
FIG. 1 is a simplified schematic view of a known steam turbine as may be used herein.

Referring now to the drawings, in which like numerals refer to like elements throughout the several views, FIG. 1 is a schematic view of an example of a known steam turbine 10 as may be used herein. The steam turbine 10 may include a high pressure ("HP") section 12 and an intermediate pressure ("IP") section 14. An outer shell or casing 16 may be divided axially into upper and lower half sections 18, 20 respectively and span both the HP section 12 and the IP section 14. A central section 22 of the casing 16 may include a high pressure steam inlet 24 and an intermediate pressure steam inlet 26. Within the casing 16, the HP section 12 and the IP section 14 may be arranged in a single bearing span supported by an HP journal bearing 28 and an IP journal bearing 30. An HP steam seal unit 32 and an IP steam seal unit 34 are located inboard of each journal bearing 28, 30, respectively.

Although the examples described herein are in the context of the HP section 12 and the IP section 14, a low pressure ("LP") section and/or other compressor or turbine sections also may be applicable herein. Likewise, the present application also may be applicable to gas turbine compressors and turbines as well.

An annular section divider 36 may extend radially inward from the central section 22 towards a rotor shaft 38 that extends between the HP section 12 and the IP section 14. More specifically, the divider 36 extends circumferentially around a portion of the rotor shaft 38 between a first HP section nozzle 40 and a first IP section nozzle 42. The divider 36 may be received in a channel 44 defined in a packing casing 46. More specifically, the channel 44 may be a C-shaped channel that extends radially into the packing casing 46 such that a center opening of the channel 44 faces radially outward. Other designs and configurations may be used herein for the steam turbine 10 and the components therein.

During operation, the high pressure steam inlet 24 receives high pressure/high temperature steam from a steam source, for example, a power boiler (not shown). Steam is routed through the HP section 12 where work is extracted from the steam to rotate the rotor shaft 38. The steam then exits the high pressure section 12 and may be returned to the boiler where it is reheated. The reheated steam is then routed to the intermediate pressure steam inlet 26 and forwarded to the IP section 14. The steam entering the IP section 14 may be at a reduced pressure then the steam entering the HP section 12, but at an approximately equal temperature. Accordingly, the operating pressure within the HP section 12 may be higher than the operating pressure within the IP section 14. As such, steam within the HP section 12 tends to flow towards the IP section 14 through leakage passages that may develop between the HP section 12 and the IP section 14. A first such leakage path 48 thus may be defined as extending through the packing casing 46 about the rotor shaft 38.

Figure 2:
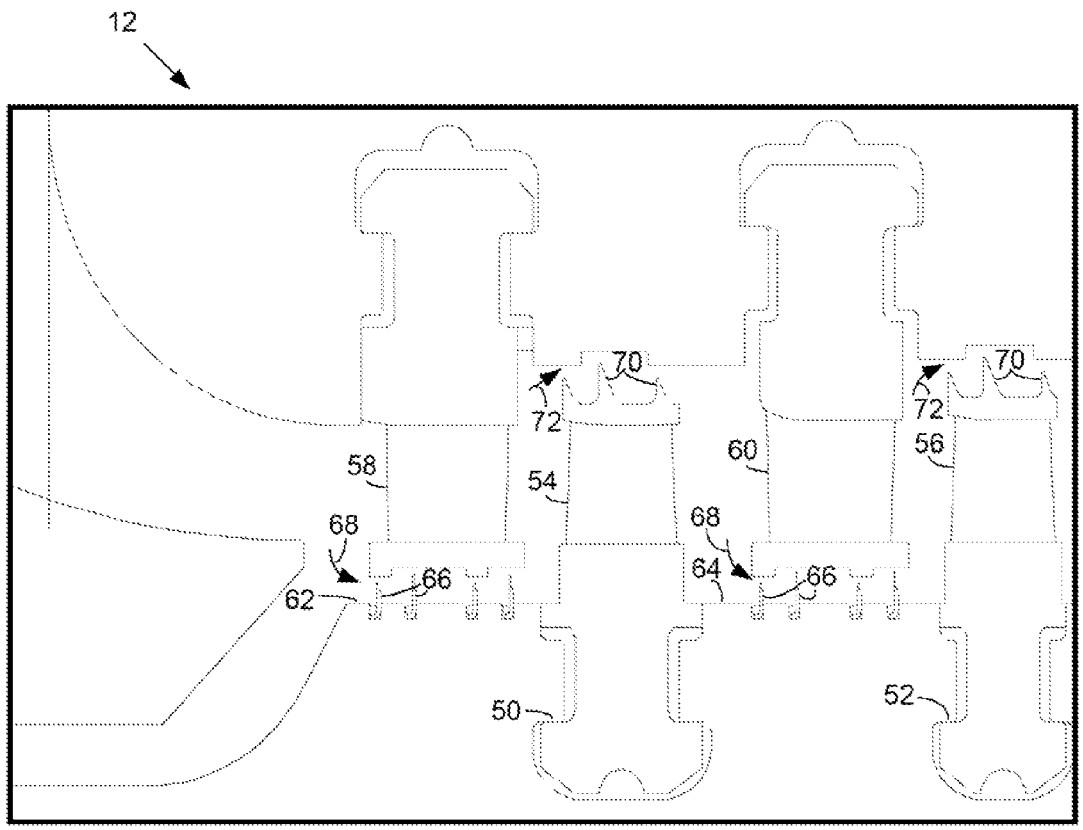
FIG. 2 is a side cross-sectional view of a section of the steam turbine of FIG. 1.

FIG. 2 shows a side cross-sectional view of the HP section 12. The HP section 12 may include any number of rotor disks with a first rotor disk 50 and a second rotor disk 52 shown. The rotor disks 50, 52 may be spaced apart from one another at a predetermined distance. Each rotor disk 50, 52 supports a turbine blade with a first turbine blade 54 and a second turbine blade 56 shown. The HP section 12 also may include a number of stators or similar types of fixed structure that project between the rotor disks 50, 52 and portions of the blades 54, 56. In this example, a first stator 58 and a second stator 60 are shown. The HP section 12 also may include a number of sealing rings with a first sealing ring 62 and a second sealing ring 64 shown. The sealing rings 62, 64 may be attached to the rotors 50, 52 via an interference fit or any type of fastener and the like.

The sealing rings 62, 64 may include a number of labyrinth teeth 66 positioned therein. The labyrinth teeth 66 may be positioned so as to face the stators 58, 60. The labyrinth teeth 66 also may be mounted directly on the surface of the rotors 50, 52 without the sealing rings 62, 64. As is shown, the labyrinth teeth 66 may have a substantial "J"-type shape. Other shapes also may be used herein. Any number of labyrinth teeth 66 may be used herein. Other types of seals also may be used herein. The stators 58, 60 and the labyrinth teeth 66 may define a second leakage flow path 68 therethrough. The labyrinth teeth 66 also may be positioned on the stators 58, 60 or otherwise.

The blades 54, 56 also may have a number of blade labyrinth teeth 70, tips, or other types of seals positioned thereon. The blade labyrinth teeth 70 or other types of seals may face the casing 16 of the HP section 12. The blade labyrinth teeth 70 and the casing 16 thus may define a third leakage flow path 72 therethrough. Other leakage flow paths may be present herein.

Figure 3:
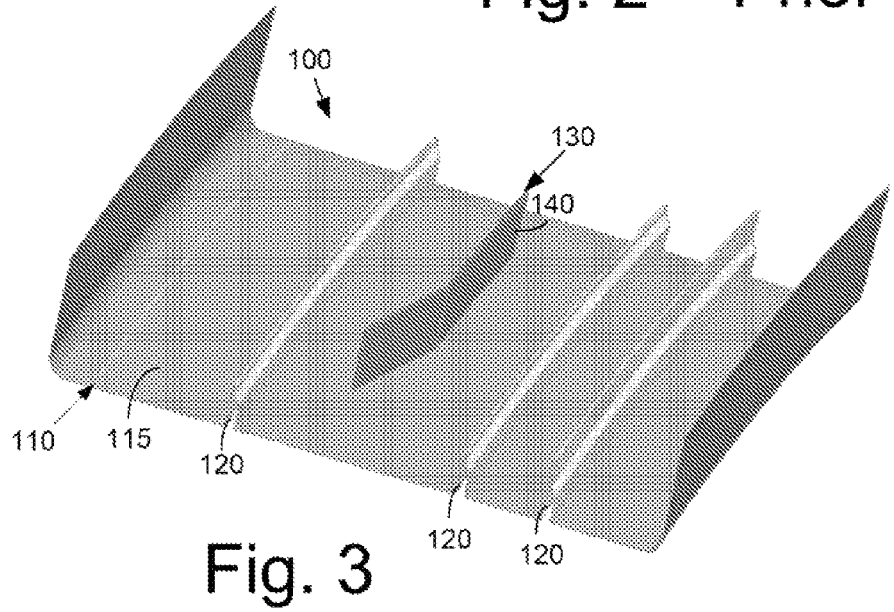
FIG. 3 is a perspective view of an adverse pressure gradient seal mechanism as may be described herein.
Figure 4:
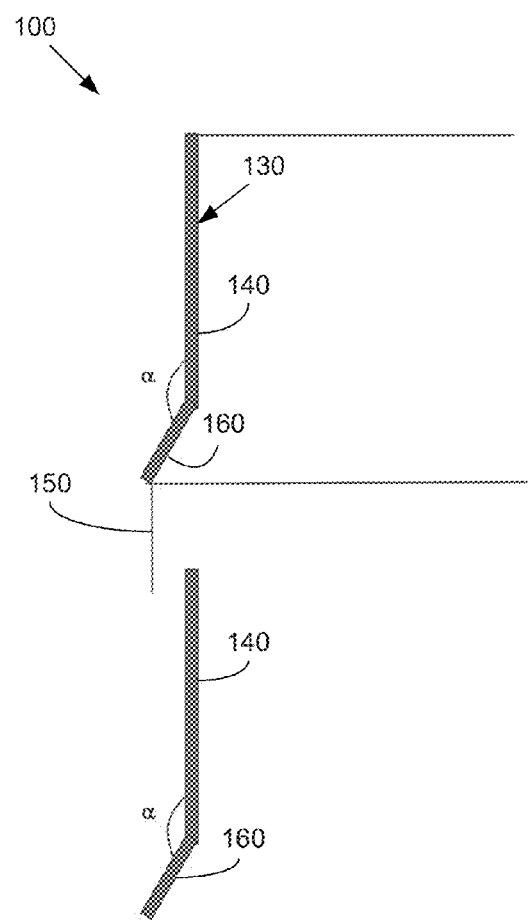
FIG. 4 is a top plan view of the adverse pressure gradient seal of the adverse pressure gradient seal mechanism of FIG. 3.

FIGS. 3 and 4 show an adverse pressure gradient seal mechanism 100 as may be described herein. The adverse pressure gradient seal mechanism 100 may be mounted on a rotating component 110. The rotating component 110 may be a sealing ring 115 similar to that described above, the rotating shaft 38 itself, or otherwise. Specifically, the adverse pressure gradient seal mechanism 100 may be mounted on any type of rotating component 110 as may be described in more detail below. The rotating component 110 may include a number of labyrinth teeth 120 positioned thereon. The labyrinth teeth 120 may have the substantial "J"-shape described above or any similar shape. Any number of labyrinth teeth 120 may be used herein. Although the labyrinth teeth 120 may be mounted on either the rotors 50, 60, the stators 58, 60, or otherwise, the adverse pressure gradient seal mechanism 100 preferably is mounted on the surface with the higher relative speed.

The adverse pressure gradient seal mechanism 100 also may include a number of adverse pressure gradient seals 130 positioned thereon. As is shown, the adverse pressure gradient seals 130 may have an axial "fan" type shape. The adverse pressure gradient seals 130 may be in the form of discrete strips 140 such that a number of the strips 140 may be used about the circumference of the sealing disk 115 with a gap 150 between each pair of strips 140. The adverse pressure gradient seals 130 may have any length or height with a gap 150 of any length therebetween. As is shown in FIG. 4, each adverse pressure gradient seal 130 may have an angled end 160 thereon positioned at an angle α. The angled end 160 may be straight or curved with respect to normal to the axis of rotation. The angle α as shown may range from about ninety to about one hundred eighty degree although any angle may be used herein.

Variables in design of the adverse pressure gradient seal mechanism 100 thus may include the number of adverse pressure gradient strips 140, the length of the adverse pressure gradient strips 140, the height of the adverse pressure gradient strips 140, the length of the gaps 150, the angle α of the angled ends 160, and the length of the angled ends 160. The axial location, i.e., the surface on which the labyrinth teeth 120 are mounted, the overall configuration, and other variables also may be considered herein. Different shapes and sizes also may be used herein. Construction and assembly of the adverse pressure gradient seals 130 may be similar to that of the labyrinth teeth 66 described above.

In this example, the adverse pressure gradient seals 130 may replace one or more of the labyrinth teeth 120 along the circumference of the rotating component 110. Any number of adverse pressure gradient seals 130 may be used. In rotation, the adverse pressure gradient seals 130 may produce an adverse pressure gradient against the pressure gradient that causes the flow thereacross. This adverse pressure gradient may reduce the static pressure downstream thereof and thus may reduce the mass flow across the labyrinth teeth 120 following the adverse pressure gradient seals 130. The last labyrinth tooth 120 in the adverse pressure gradient seal mechanism 100 in the direction of flow may act as a restrictor. The prior labyrinth teeth 120 also may help reduce the static pressure ahead of the last labyrinth tooth 120.

The use of the adverse pressure gradient seal mechanism 100 thus provides a reduction in the leakage flow therethrough as compared to the torturous path provided by the conventional labyrinth teeth 66 described above and the like. Specifically, the adverse pressure gradient seal 130 builds an adverse pressure gradient against the leakage with reduced downstream static pressure so as to reduce the leakage mass flow across all of the labyrinth teeth 120 downstream of the adverse pressure gradient seal 130. Reducing the mass flow thus makes the overall sealing mechanism 100 more effective.

Likewise, the adverse pressure gradient seal 130 may increase the circumferential velocity of the upstream fluid. This increase in the circumferential velocity also may reduce heat transfer to the rotors 50, 52. The axial velocity across the adverse pressure gradient seal 130 may be higher due to the higher pressure drop thereacross. The average axial velocity downstream of the adverse pressure gradient seal 130 may be lower as is the mass flow rate. The reduction in the static pressure may be higher locally across the adverse pressure gradient seals 130 as compared to the gaps 150. The increase in circumferential velocity, however, also may be present in the gaps 150 or otherwise.

The use of the gaps 150 between the adverse pressure gradient seals 130 may allow some leakage flow therethough and, hence, cause a power loss of some degree. Any such power loss associated with the gaps 150, however, should be negated with the power gain in the reduction in interstage leakage and elsewhere for a net power and performance gain as compared to the use of the labyrinth teeth 66 alone. The reduction in the parasitic leakage flow thus should improve the overall performance of the turbo-machinery.

Although the adverse pressure gradient seal mechanism 100 has been described in the context of the rotors 50, 52 and the stators 58, 60, the adverse pressure gradient seal mechanism 100 also may be applicable to the first leakage path 48 across the packing casing 46. Likewise, the adverse pressure gradient seal mechanism 100 may be applicable to the third leakage path 72 between the blades 54, 56 and the casing 16 and elsewhere. As such, the rotating component 110 may include the sealing disk 115, the rotor 38 within the packing casing 46, the turbine blades 54, 56, and the like. Specifically, the adverse pressure gradient seal mechanism 100 may be used in any cavity involving variable speed surfaces.

The adverse pressure gradient seal mechanism 100 also may help in reducing heat transfer on the rotor surfaces because the adverse pressure gradient seals 130 increase the swirl. Sizing and configuring the adverse pressure gradient seal 130 also may control the leakage flow across the adverse pressure gradient seals 130 as desired. The adverse pressure gradient seal mechanism 100 also may be used with gas turbines and any other type of rotating machinery.

The adverse pressure gradient seal mechanism 100 also may be used in the reverse configuration so as to help draw air into, for example, the purge cavities and the like. Other configurations may be used herein.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. An adverse pressure gradient seal mechanism for use with variable speed components, comprising:
   a plurality of labyrinth teeth positioned on a component and each extending circumferentially along a surface of the component; and
   an adverse pressure gradient seal positioned between a pair of the plurality of labyrinth teeth;
   the adverse pressure gradient seal comprising a plurality of strips circumferentially spaced along the surface with a plurality of circumferential gaps therebetween; and
   the plurality of strips each comprising a first portion substantially parallel to the plurality of labyrinth teeth and a second portion non-parallel to the plurality of labyrinth teeth and the first portion, the plurality of strips configured to generate an adverse pressure gradient upon axial rotation of the component.

2. The adverse pressure gradient seal mechanism of claim 1, wherein the component comprises a rotating component.

3. The adverse pressure gradient seal mechanism of claim 2, wherein the rotating component comprises a sealing ring or rotor.

4. The adverse pressure gradient seal mechanism of claim 2, wherein the rotating component comprises a rotor within a packing casing.

5. The adverse pressure gradient seal mechanism of claim 2, wherein the rotating component comprises a turbine blade.

6. The adverse pressure gradient seal mechanism of claim 1, wherein the plurality of strips forms a fan configured to generate the adverse pressure gradient upon axial rotation of the component.

7. A method of limiting a leakage flow through variable speed components, comprising:
   positioning a plurality of labyrinth teeth on one of the variable speed components, wherein the plurality of labyrinth teeth each extend circumferentially along a surface of the one of the variable speed components;
   positioning an adverse pressure gradient seal between a pair of the plurality of labyrinth teeth, wherein the adverse pressure gradient seal comprises a plurality of strips circumferentially spaced along the surface with a plurality of circumferential gaps therebetween, and wherein the plurality of strips each comprise a first portion substantially parallel to the plurality of labyrinth teeth and a second portion non-parallel to the plurality of labyrinth teeth and the first portion;
   rotating the variable speed components;
   producing an adverse pressure gradient about the adverse pressure gradient seal; and
   reducing the leakage flow across the variable speed components.

8. The method of claim 7, wherein the step of producing an adverse pressure gradient comprises reducing a static pressure downstream of the adverse pressure gradient seal.

9. The method of claim 7, wherein the step of reducing the leakage flow across the variable speed components comprises reducing the leakage flow across a sealing ring or rotor.

10. The method of claim 7, wherein the step of reducing the leakage flow across the variable speed components comprises reducing the leakage flow across a packing casing.

11. The method of claim 7, wherein the step of reducing the leakage flow across the variable speed components comprises reducing the leakage flow across a turbine blade.

12. The method of claim 7, further comprising the step of varying a length of the plurality of strips so as to vary the leakage flow across the variable speed components.

13. The method of claim 7, further comprising the step of varying a length of the plurality of circumferential gaps so as to vary the leakage flow across the variable speed components.

14. The method of claim 7, further comprising the step of varying an angle of the second portion relative to the first portion so as to vary the leakage flow across the variable speed components.

15. An adverse pressure gradient seal mechanism for use with a turbine section, comprising:
   a plurality of labyrinth teeth positioned on a sealing ring between a rotor and a stator and each extending circumferentially along a surface of the sealing ring; and
   an adverse pressure gradient seal positioned between a pair of the plurality of labyrinth teeth;
   the adverse pressure gradient seal comprising a plurality of strips circumferentially spaced along the surface with a plurality of circumferential gaps therebetween; and
   the plurality of strips each comprising a first portion substantially parallel to the plurality of labyrinth teeth and a second portion non-parallel to the plurality of labyrinth teeth and the first portion, the plurality of strips configured to generate an adverse pressure gradient upon axial rotation of the rotor.

16. The adverse pressure gradient seal mechanism of claim 15, wherein the plurality of strips forms a fan configured to generate the adverse pressure gradient upon axial rotation of the rotor.

* * * * *